UNITED STATES PATENT OFFICE.

GOTTLIEB PREISENDANZ, OF GRIDLEY, ILLINOIS, ASSIGNOR OF ONE-HALF HIS RIGHT TO JOHN E. CLAUDIN, OF SAME PLACE.

IMPROVEMENT IN HOG-CHOLERA MEDICINES.

Specification forming part of Letters Patent No. 195,165, dated September 11, 1877; application filed April 3, 1877.

*To all whom it may concern:*

Be it known that I, GOTTLIEB PREISENDANZ, of Gridley, in the county of McLean, in the State of Illinois, have invented a new and useful Medicine for the Prevention, Treatment, and Cure of Hog-Cholera; and do hereby declare that the following is a full, clear, and exact description of the ingredients, the quantity of each, and the mode of compounding and using the same.

It is compounded of the following articles, viz: Three ounces of tincture of veratrum album root; six ounces of tincture of aconite-root; two ounces of asafetida; one gallon of alcohol; five ounces of copperas; five ounces of spirits of sweet niter; five ounces of diluted phosphoric acid, or an equivalent quantity of phosphorus in any convenient vehicle; one pint of turpentine; five ounces solution of arsenic; one quart of rain-water.

These articles are all mixed and bottled for use; and for treating the "dry cholera," (so called,) one table-spoonful of the above mixture is given to each diseased hog morning, noon, and night, until the animal is cured, which will be very soon. For the following stage of the disease, or when the animal has a swelled throat, breast, and belly, or the secondary stage of cholera, I throw into the above medicine four ounces of muriate of ammonia; three ounces of powdered aloes; one pound of powdered nitrate of potash; two ounces of spongia pills, as put up by chemists for homeopathic doses, the dose for each animal being the same, as well as the time, viz., morning, noon, and night.

If the disease is taken or treated during the first stage mentioned above, then the mixture of the second list of ingredients with the first will be unnecessary. I use the whole of the enumerated medicines in the secondary stage of the hog-cholera in the proportions stated.

What I claim as my invention is—

The medicine for the cure of hog-cholera composed of the tincture of veratrum album, tincture of aconite-root, asafetida, alcohol, copperas, spirits of sweet niter, diluted phosphoric acid, or equivalent of phosphorus in any convenient shape, turpentine, solution of arsenic, rain-water, muriate of ammonia, powdered aloes, powdered nitrate of potash, and spongia, in about the proportions and used as and for the purposes specified.

In testimony that I claim the foregoing medicine for the cure of hog-cholera I have hereunto set my hand this 27th day of March, 1877.

GOTTLIEB PREISENDANZ

Witnesses:
 JAMES M. MORSE,
 J. C. MORSE.